United States Patent [19]
Irie et al.

[11] Patent Number: 5,867,209
[45] Date of Patent: Feb. 2, 1999

[54] TELEVISION TELEPHONE WHICH DISPLAYS IMAGE DATA HAVING A FIRST PRECISION DEGREE AND IMAGE DATA HAVING A SECOND PRECISION DEGREE ON A RESPECTIVE DISPLAY REGION OF A DISPLAY SCREEN

[75] Inventors: Yuichiro Irie, Kunitachi; Shigenori Morikawa, Kokubunji; Shigeki Kurahashi, Hachioji; Shingo Omata, Fussa, all of Japan

[73] Assignee: Casio Computer Co., Ltd, Tokyo, Japan

[21] Appl. No.: 555,183

[22] Filed: Nov. 8, 1995

[30]     Foreign Application Priority Data

Nov. 18, 1994  [JP]  Japan ................................... 6-285611
Nov. 20, 1994  [JP]  Japan ................................... 6-311220
Nov. 20, 1994  [JP]  Japan ................................... 6-311221
Jul. 12, 1995  [JP]  Japan ................................... 7-176205

[51] Int. Cl.$^6$ ............................. H04N 7/12; H04M 11/00
[52] U.S. Cl. ........................... 348/19; 348/18; 379/93.17
[58] Field of Search ................... 348/14–19; 379/96–99, 379/93, 201, 202, 203, 204, 205, 212, 93.17, 93.21, 93.23, 93.26, 93.28, 93.37, 93.01

[56]              References Cited

U.S. PATENT DOCUMENTS 4,961,211  10/1990  Tsugane et al. ........................... 348/15
4,962,521  10/1990  Komatsu et al. .......................... 348/18
4,985,911   1/1991  Emmons et al. .
5,073,926  12/1991  Suzuki et al. ............................. 348/17
5,077,784  12/1991  Fujita et al. .
5,206,721   4/1993  Ashida et al. ............................ 348/15
5,382,972   1/1995  Kannes ..................................... 348/14
5,436,654   7/1995  Boyd et al. ............................... 348/15
5,477,546  12/1995  Shibata et al. ........................... 348/15
5,541,982   7/1996  Bergler .................................... 348/14
5,568,185  10/1996  Yoshikazu ................................ 348/17

FOREIGN PATENT DOCUMENTS

0500091 A2  8/1992  European Pat. Off. .

*Primary Examiner*—Wing F. Chan
*Attorney, Agent, or Firm*—Frishauf, Holtz, Goodman, Langer & Chick

[57]              ABSTRACT

A television telephone apparatus is coupled with a home-use large-screen TV receiver and a home-use telephone, and is connectable to another television telephone apparatus of a counter party via the home-use telephone and the public telephone network. The telephone television apparatus is equipped with a camera unit, so that both of an image produced by the camera unit, and an image transmitted from the television telephone apparatus of the counter party can be simultaneously displayed on the home-use large-screen TV receiver. While the handset of the home-use telephone is used to send/receive voice of operators, voice may be reproduced from the speaker of the home-use TV receiver. Both of an intermittent moving image having a standard image density and a still image having a relatively fine image density can be transmitted/received, so that the intermittent moving image and the still image can be simultaneously displayed on the screen of the home-use large-screen TV receiver.

6 Claims, 12 Drawing Sheets

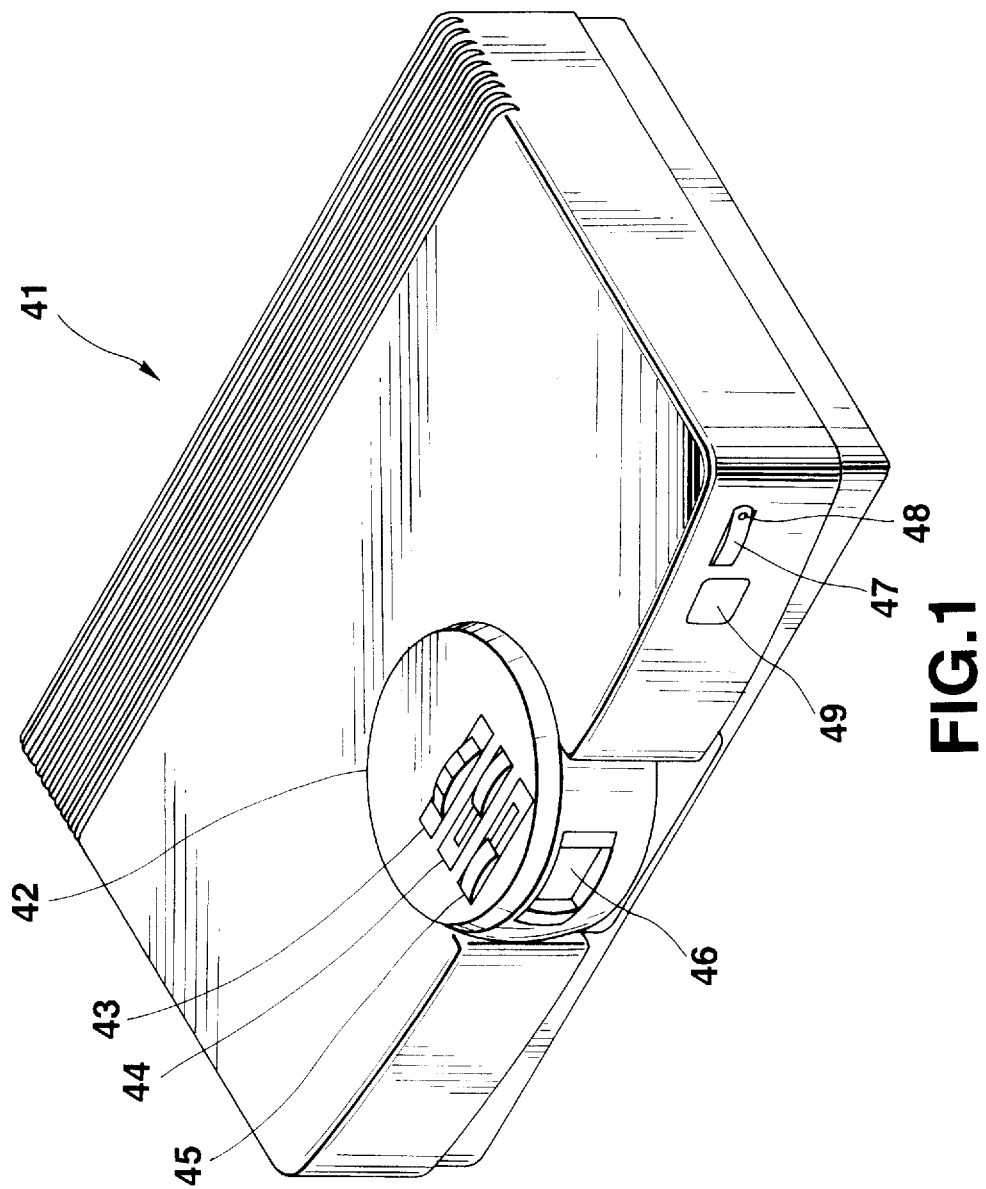

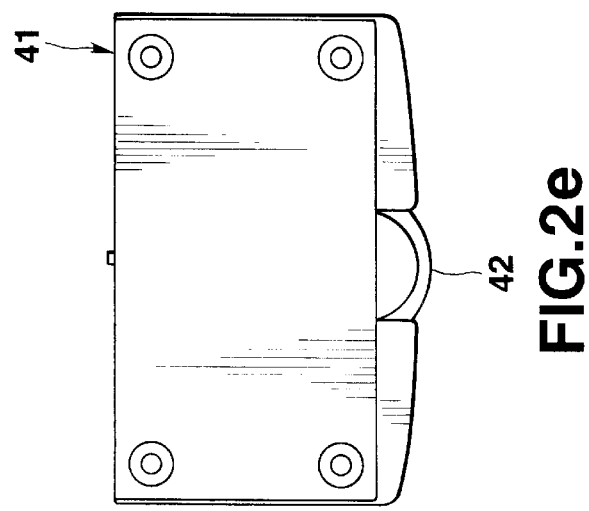
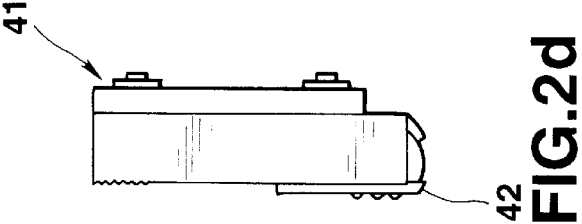
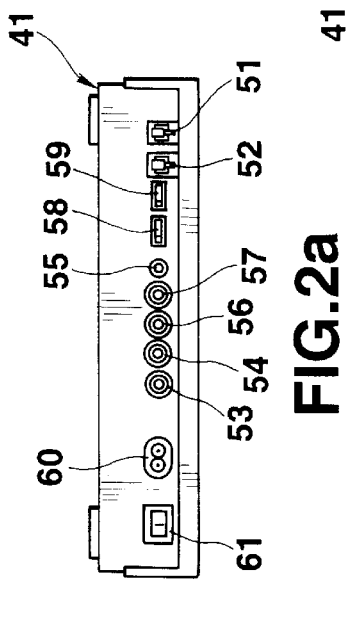
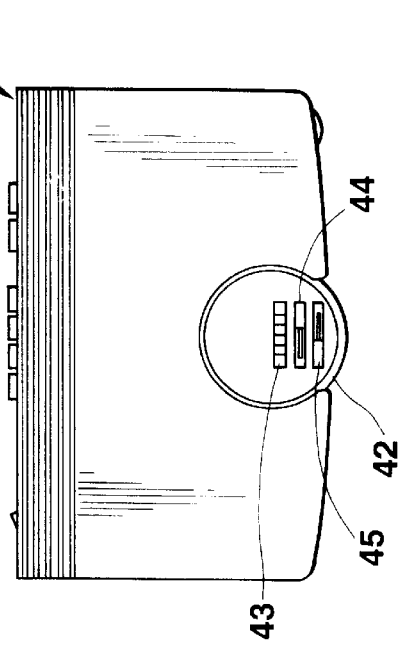
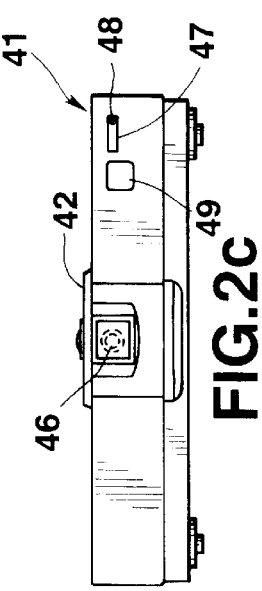

TELEVISION TELEPHONE WHICH DISPLAYS IMAGE DATA HAVING A FIRST PRECISION DEGREE AND IMAGE DATA HAVING A SECOND PRECISION DEGREE ON A RESPECTIVE DISPLAY REGION OF A DISPLAY SCREEN

BACKGROUND OF THE INVENTION

1. Field of the Invention

The present invention generally relates to a television telephone apparatus (so-called "TV phone") capable of transmitting/receiving an image via a telephone line. More specifically, the present invention is directed to a TV phone capable of transmitting voice data and image data related to a color intermittent still image.

2. Description of the Related Art

According to the recent development of highly information-oriented society, there is an increasing demand for communication media by which a vast amount of various types of information are transmitted quickly. To fulfill such a demand in Japan, the "analog telephone band still picture video communication system" was established in 1988 as a standard communication system to allow for communication of a monochromatic image between parties over a communication line. The standard was amended in 1989 to enable a color image as well as a monochromatic image can be exchanged. Various television telephone apparatuses (TV phones) which conform to those standards have been developed so far. The TV telephone apparatuses are expected to become popular because they enable visual information to be sent to cover voice-based information or explain what would otherwise be difficult to understand or visualize and because telephone communication is made possible while watching the caller's or receiver's expressions.

TV telephone apparatuses are classified by types of communication networks to be linked and the types of image and voice transmission functions. For example, some TV telephone apparatuses are connected to an analog public telephone line to transmit a monochromatic still picture or a color still picture, or to transmit a color dynamic image. The still-picture TV telephone apparatus, which is connected to an analog public telephone line to send a monochromatic still picture, employs a system for directly transmitting image data without compression. For monochromatic image data of 64 gray scales (6 bits) with one screen consisting of 100×160 pixels, for example, data of about 100×160×6= 96000 bits (12 Kbytes) has been transmitted at a transfer rate of about 8740 bps (bit per second). This takes about 11 seconds to send one screen of image data.

Image data carries a large amount of information so that direct processing of image data is not practical in view of memory capacity, communication speed and so forth. As a solution, there has been proposed a color dynamic-image TV telephone apparatus which compresses image data and voice data to about ½₀ to ¹⁄₁₀₀ before transmission to thereby ensure transmission and reception of a dynamic image at a rate of two to ten frames per second using an analog telephone band.

As the compressed transmission of image data will transfer a considerable amount of data, a slight transmission delay will not affect the progression of telephone communication so much. Therefore, variable length coding (e.g., variable length coding system which conforms to H. 261 of the CCITT (Comite Consultatif International Telegraphique et Telephonique) regulations) is typically employed.

In compressed transmission of voice data, digitalization of voice data can compress the length of the average produced bits. Generally speaking, if entropy compression (e.g., Hoffman coding) which does not guarantee the maximum bit length is adapted for voice signals, a large transmission delay of voice signals occurs when voice signals are converted to a long bit length by the entropy compression. This would greatly affect the progression of telephone communication. In this respect, voice data is encoded with a fixed bit length before transmission.

TV telephone apparatuses which are connected to an analog communication network have a communication function to transmit/receive image data and voice data in multiplexed form. A communication protocol corresponding to the communication networks to be linked and a coding system for image data and voice data, which are affixed to a protocol-based communication signal for transmission/reception, are specified for each type of communication network by the CCITT regulations, etc.

The conventional TV telephone apparatuses generally are arranged with telephones, cameras, and display units in an integral form, as described in U.S. Pat. No. 5,077,784. Accordingly, since the size of the display unit should be made small, when a plurality of images are simultaneously displayed on the plural subdivided screens, respectively, these displayed images are not easily visible.

On the other hand, as disclosed in U.S. Pat. No. 4,985, 911, the television telephone apparatus is connectable to the presently existing telephone is the detachable manner. In this type of conventional television telephone apparatus, since the display area of the display unit would be small, when a plurality of images are simultaneously displayed on the relevant subdivided display areas, these displayed images cannot be easily observed.

SUMMARY OF THE INVENTION

The present invention has been made in an attempt to solve the above-described problems of the multi-image display, and therefore, has an object to provide such a television telephone apparatus capable of simultaneously displaying a plurality of easily visible images.

To achieve the above-described object, a television telephone apparatus, according to one aspect of the present invention, is featured by comprising:

acquisition means for acquiring both of image data and voice data:

communication control means for transmitting said image data and said voice data acquired by said acquisition means to a communication line, and for receiving image data and voice data from the communication line; and output means for outputting one of said image/voice data received by said communication means and said image/voice data acquired by said acquisition means; wherein:

said communication control means includes a first input/output terminal connected to the communication line and a second input/output terminal detachably connected to an externally provided telephone, and is provided to be interposed between said communication line and said externally provided telephone; and said output means includes a video output terminal for outputting the image data to an externally provided display apparatus detachably connected to said video output terminal, and display control means for editing one of said image data received by said communication control means and said image data acquired by said acquisition means, subdivides a display screen into a plurality of display regions, and outputs to said picture output terminal, such image data used to display a plurality of images on a single screen.

Also, a television telephone apparatus, according to another aspect of the present invention, is featured by comprising display control means for displaying one of a self-image of an operator and an image of a counter party, in which image data about the self-image of the operator and the image of the counter party is transmitted/received via a communication line, wherein:

said display control means includes:
full-sized screen display means for displaying a single image on the entire display screen;
multi-screen display means for subdividing the display screen into a plurality of regions and for displaying images different from each other on the plural regions; and
mother/child screen display means for displaying a compressed image on a portion of the display screen as a child screen.

With the above-described arrangement of the television telephone apparatus according to the present invention, this television telephone apparatus is merely connected to the communication line, the presently existing (home-use) telephone, and the externally provided display apparatus (home-use TV receiver), either the received imaged data, or the acquired image data are edited, and the entire display screen of this externally provided display apparatus is subdivided into a plurality of display regions. As a consequence, a plurality images can be simultaneously displayed on the relevant subdivided display regions, for instance, both of a moving image and a still image are simultaneously displayed on the corresponding subdivided display regions within the display screen.

BRIEF DESCRIPTION OF THE DRAWINGS

For a better understanding of the present invention, reference is made of the detailed descriptions to be read in conjunction with the drawings in which:

FIG. 1 is a perspective view for representing an outer arrangement of a television telephone apparatus according to an embodiment of the present invention;

FIGS. 2a–2e show rear, plane, front, side and bottom views of the television telephone apparatus according to this embodiment of the present invention;

DETAILED DESCRIPTION OF THE PREFERRED EMBODIMENTS

Figure 3A:
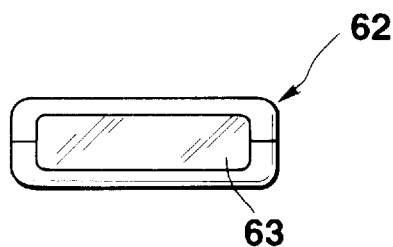
FIGS. 3a–3b schematically indicates an outer structure of a remote controller employed in the television telephone apparatus of this embodiment.

Referring now to drawings a television telephone apparatus according to an embodiment of the present invention will be described in detail.

It should be noted that as a communication line used in the television telephone apparatus, the public switched telephone network (PSTN) is employed in the following embodiment of the present invention.

OVERVIEW OF TELEVISION TELEPHONE APPARATUS

FIG. 1 is a perspective view for showing an outer appearance of a television telephone apparatus (so-called "TV phone") 41 according to one preferred embodiment of the present invention. FIG. 2a indicates a rear view of the television telephone apparatus 41, FIG. 2b represents a plan view thereof, FIG. 2c shows a front view thereof, FIG. 2d denotes a side view thereof, and FIG. 2e shows a bottom view thereof.

In FIG. 1 and FIGS. 2a–2e the television telephone apparatus 41 is arranged by a cylindrical camera block 42 used to acquire an image appeared in front of this camera block 42. The camera block 42 is constructed of a focus controlling lever 43 for controlling an acquisition of an input image, a lens switching lever 44 for switching a camera angle, a lens cover lever 45 used to prohibit the image acquisition, and a camera lens unit 46 for acquiring the image.

In addition to the above-described equipment, the television telephone apparatus 41 further includes, at a front surface unit thereof, a start/stop button 47 used when the television telephone apparatus 41 is turned ON/OFF, an LED (light emitting diode) 48 built in this start/stop button 47 for indicating operation conditions, and a remote-controller light receiving unit 49 used to control the television telephone apparatus 41 by receiving a light signal transmitted from a remote controller (will be discussed later).

As shown in FIG. 2a, the following components are provided on the rear surface of the television telephone apparatus 41 according to this embodiment of the present invention. That is, there are employed a connection terminal 51 (6 poles/4 cores) connectable to a telephone line (PSTN), another connection terminal 52 (4 poles/4 cores) connectable to the existing telephone, a video input terminal 53 for acquiring an image, a voice input terminal 54 for entering a voice externally supplied, a microphone input terminal 55, a video output terminal 56 for externally outputting video/voice, and a voice output terminal 57.

Further, a microphone input level controlling knob 58 for controlling volume of the microphone input/voice input, and a line input level controlling knob 59 are provided.

In addition, an AC power supply input terminal 60 and a main power supply switch 61 are employed as the power supply equipment.

Figure 3B:
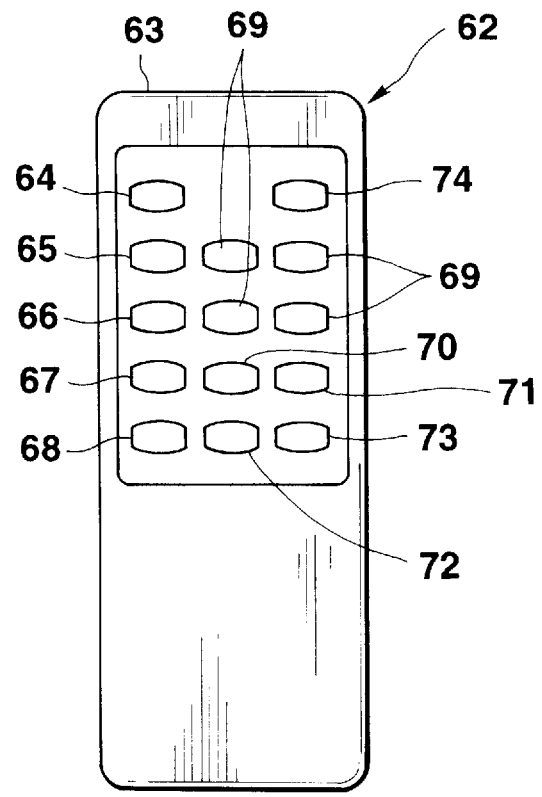

FIGS. 3a–3b schematically indicates a remote controller 62 for controlling the television telephone apparatus 41 shown in FIG. 1 and FIG. 2. More specifically, FIG. 3a is a top view of this remote controller 62 and FIG. 3b is a front view thereof. In FIG. 3a, a remote controller transmitter unit 63 for producing a remote-controller control signal is provided on an upper surface of the remote controller 62. The remote-controller control signal is formed by modulating infrared rays by a control signal so as to control the television telephone apparatus 41.

On the remote controller 62 indicated in FIG. 3b, various operation keys are arranged. That is, there are provided a function key 64 for switching functions of a keyboard in order to achieve various operations whose number is greater than a total number of keys, a multi-screen/YES selection key 65 used to select a multi-screen and an "YES" function, and a child-screen/NO selection key 66 used to select a child-screen and a "NO" function. Furthermore, the operation keys are a save key 67 for saving data, an acquisition key 68 for acquiring image data and the like, a screen selection key 69 for selecting the corresponding screens when the multi-screen is selected, a delete key 70 for deleting the saved image data and the like, a camera/video selection key 71 for selecting the image acquired from the camera block 42 and the image entered into the video input terminal 53, a transmit key 72 for transmitting the image data and the like acquired by the camera, a calling key 73 used when a counter party of the television telephone apparatus 41 is called, and a start/stop key 74 for starting/stopping a preselected operation of the television telephone apparatus 41.

COMMUNICATION CONNECTION DIAGRAM

Figure 4A:
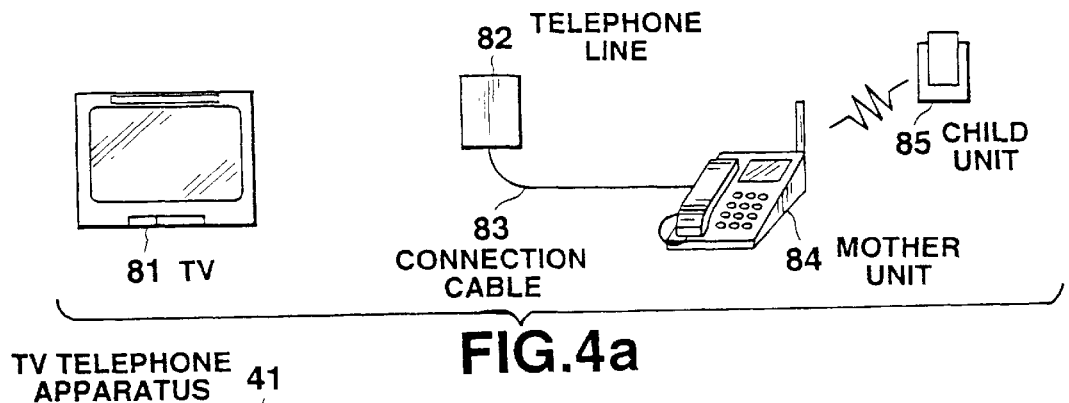
FIGS. 4A–4C schematically indicates connecting structures of the television telephone apparatus according to this embodiment.
Figure 4B:
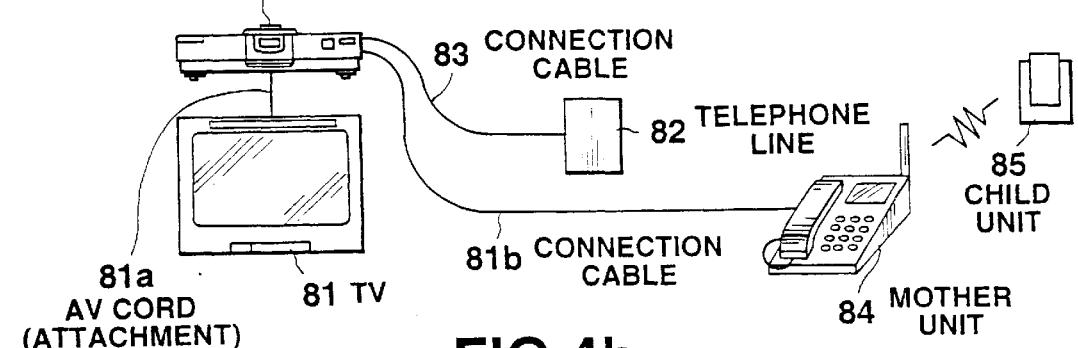
Figure 4C:
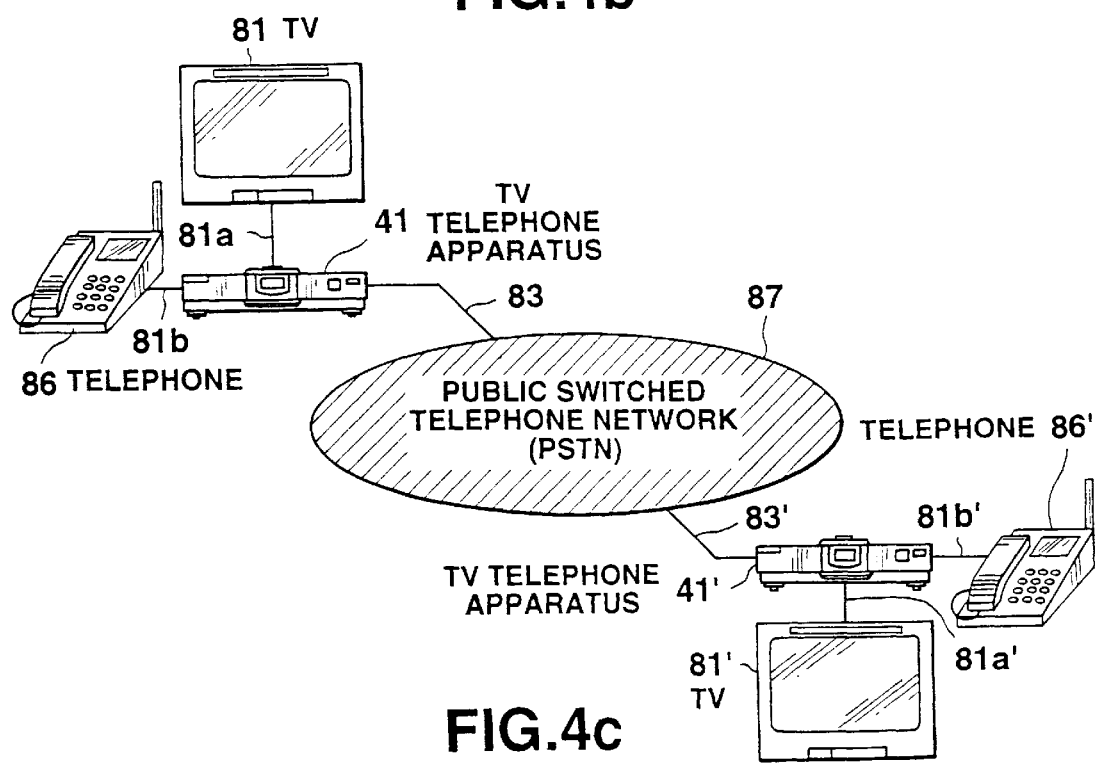

FIG. 4a to FIG. 4c schematically represent a connection diagram in which the television telephone apparatus 41 is connected to the existing telephone, a television receiver, and a communication line (in this case, public switched telephone network).

FIG. 4a shows such a condition wherein the television telephone apparatus 41 is not yet connected to the relevant equipment, but a mother unit 84 of the telephone is connected via a connection cable 83 to a telephone line 82. In FIG. 4a, reference numeral 81 indicates a television receiver which is not yet connected, and reference numeral 85 denotes a child unit of this telephone, which communicates with the mother unit 84.

FIG. 4b represents another condition wherein the television telephone apparatus 41 is connected to the relevant equipment. That is, the connection cable 83 connected to the telephone (mother unit) 84 is connected via a telephone line connection terminal 51 (FIGS. 2a–2e ) of the television telephone apparatus 41 according to the embodiment, and the telephone (mother unit) 84 is connected via the connection cable 81b to a telephone connection terminal 52 of the television telephone apparatus 41. Furthermore, the television 81 is connected via an AV cord 81a to the video output terminal 56 and the voice output terminal 57 of the television telephone apparatus 41. An AC cord is connected to the power supply input terminal 60 so as to supply power.

Under the above-described connection condition, when the main power supply switch 61 provided at the rear surface of the television telephone apparatus 41 is turned ON, an initialization ia executed to complete the connecting operation.

FIG. 4c schematically indicates a basic connection diagram in which the television telephone apparatus 41 is connected with the television 81 and the telephone 86 so as to transmit/receive image data and voice data to/from another television telephone apparatus (not shown) of a counter party via the public switched telephone network (PSTN) 87.

In this case, the connection cable 83 is connected to the telephone line connection terminal 51 (FIG. 2) of the television telephone apparatus 41, and the telephone 86 is connected via the connection cable 81b to the telephone connection terminal 52 of the television telephone apparatus 41. Furthermore, the television 81 is connected via the AV cord 81a to the video output terminal 56 and the voice output terminal 57 of the television telephone apparatus 41. The AC cord is connected to the power input terminal 60 so as to supply power. A similar connection condition is established in the counter party's equipments.

CIRCUIT ARRANGEMENT OF TELEVISION TELEPHONE APPARATUS

Figure 5:
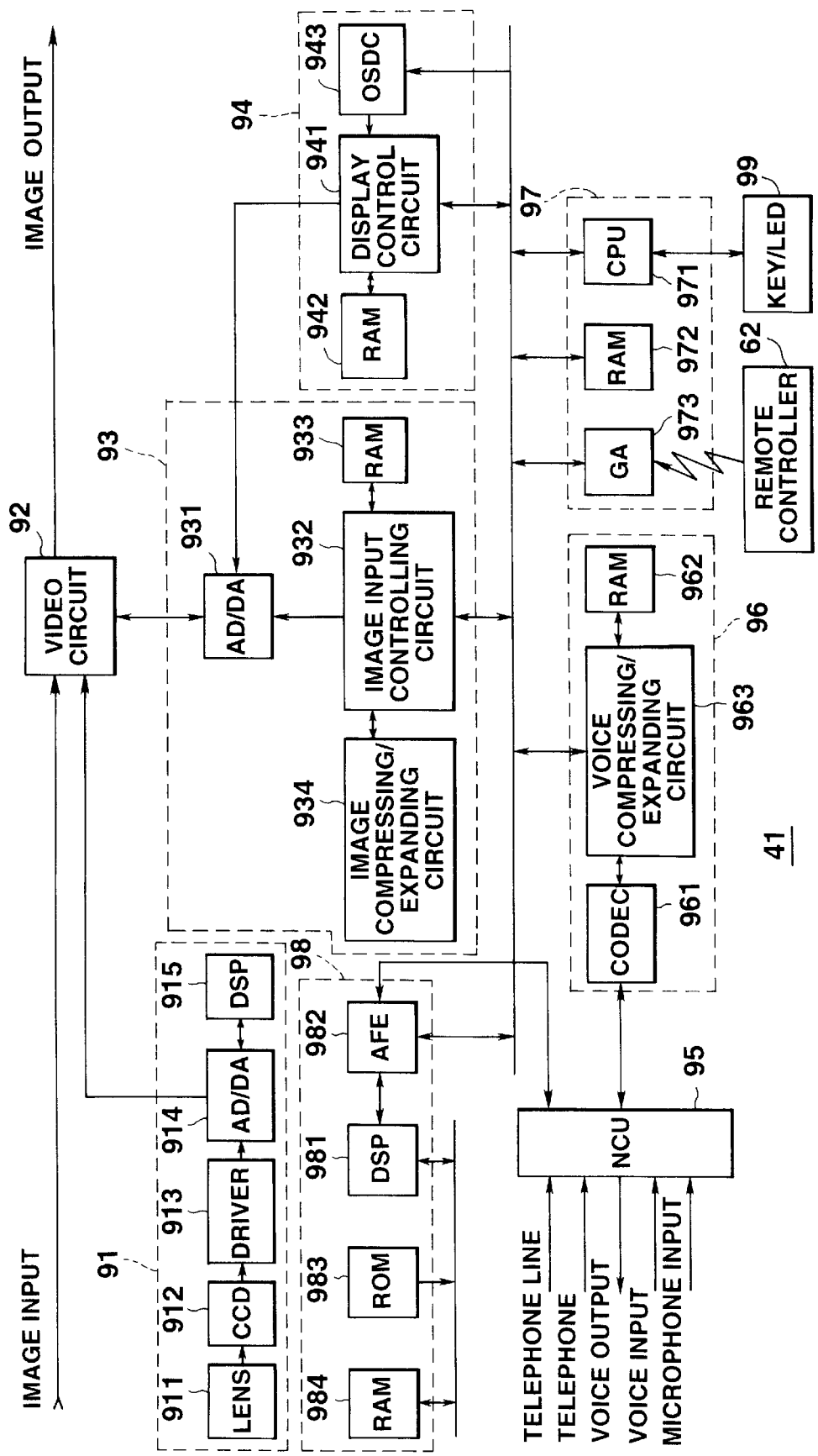
FIG. 5 is a schematic block diagram for showing a circuit arrangement of the television telephone apparatus according to this embodiment.

Referring now to FIG. 5, a circuit arrangement of the television telephone apparatus 41 according to the embodiment of the present invention will be described. As illustrated in FIG. 5, the television telephone apparatus 41 is mainly arranged by a camera unit 91, a video circuit unit 92, a video processing unit 93, an NCU (network control unit) unit 95, a voice processing unit 96, a CPU (central processing unit) unit 97, a modem (modulator/demodulator) 98, a key/LED 99, and the remote controller 62.

The camera unit 91 is used to acquire a surrounding image into the television telephone apparatus 41. The camera unit 91 is constructed of a lens 911, a CCD (charge-coupled device) 912, a CCD driver 913, an analog LSI made of an A/D converter, a D/A converter, a filter and so on (indicated as an "AD/DA" in FIG. 5), and a DSP (digital signal processor) 915 for processing color signals.

More specifically, the lens 911 is an optical lens made of glass or plastic materials. The CCD 912 produces an electric signal in response to intensity of light focused by the lens 911. Then, the produced electric signal is amplified by the CCD driver 913 and the amplified electric signal is A/D-converted by the analog LSI 914. The digital image data derived from this A/D conversion is color-processed by the DSP 915, and thereafter is D/A-converted by the analog LSI 914 to thereby output a video signal.

The video circuit unit 92 corresponds to a discrete circuit such as a sync separation and a filter. In response to an image input derived from the camera unit 91 and the image input terminal, the video circuit unit 92 switches these two image inputs under control of the remote controller 62. Then, the resultant video signal processed by this video circuit unit 92 is supplied as an input signal to the video processing unit 93.

The video processing unit 93 is arranged by an analog LSI 931 constructed of an A/D converter, a D/A converter, a PLL circuit, and a filter circuit; an image input controlling circuit 932; a RAM (random access memory) 933; and an image compressing/expanding circuit 934.

After the video signal is sync-separated by the video circuit unit 92, the luminance/color difference signals are A/D-converted by the analog LSI 931, respectively into digital data. These digital luminance/color difference data are temporarily stored in the RAM 933 under control of the image input control circuit 932. The input image data temporarily stored in this RAM 933 are sequentially read via the image input controlling circuit 932 in response to an instruction issued from the CPU unit 97, thereby being supplied to the image compressing/expanding circuit 934 (will be discussed later).

The image compressing/expanding circuit 934 performs various compression/coding processing operations to the entered image data in accordance with a predetermined coding method, namely the sort of images to be processed (in this case, still image), for example, the DCT (discrete cosine transform) quantizing process based upon the JPEG (joint photographic coding expert group) algorithm for each 8×8 pixel block, and the Hoffman coding. The compression/coding processed data are sequentially written into the RAM 933. Also, this image compressing/expanding circuit 934 owns a further function to decode/expand the compressed/coded image data in a reverse manner. That is, the image compressing/expanding circuit 934 sequentially read out the compressed/quantized/coded image data from the RAM 933, and thereafter performs the decoding/dequantized/expanded process to the compressed/quantized/coded image data. Then, the resultant image data are sequentially written into the RAM 933. As a consequence, the RAM 933 has storage regions for storing these input image data, compressed image date, and expanded image data, and these storage regions are controlled by the image input control circuit 932.

The video display unit 94 is arranged by a display control circuit 941, a RAM 942, and an OSDC (on-screen display controller) 943. Upon receipt of an instruction (will be discussed later) issued from the CPU unit 97, the display control circuit 941 sequentially transfers either the input image data, or the expanded image data temporarily stored in the RAM 933 to the RAM 942, and interpolates/thins out these image data in accordance with the display formats to produce an output image signal which will then be stored into the RAM 942. Also, in response to an instruction issued from the CPU unit 97, the display control circuit 941 reads character data from a character ROM (read-only memory) build in the OSDC 943 and synthesizes the character data with the output image signal temporarily stored in the RAM 942 to form a synthesized image signal. The analog LSI 931 D/A-converts this synthesized image signal into a video output signal which will then be supplied to the image output terminal.

The NCU unit 95 is such a discrete circuit for controlling to switch the telephone line and the telephone. This discrete circuit is constructed of a modem unit interface, a circuit for externally outputting a voice output signal to the telephone at the same time, and a circuit for synthesizing the voice input signal supplied from the telephone, the external voice input, and the microphone input signal. Then, the voice input signal from the telephone, the externally supplied voice input signal, and the voice input signal supplied from the external microphone input terminal are synthesized with each other, and then the synthesized signal is sent to the voice processing unit 96. Conversely, an output signal derived from the voice processing unit 96 is outputted to the telephone and the voice output terminal.

The voice processing unit 96 is constituted by a CODEC 961, a RAM 962, and a voice compressing/expanding circuit 963. The CODEC 961 is arranged by a filter, an A/D converter, and a D/A converter. The CODEC 961 A/D-converts the voice signal (analog signal) derived from the NCU unit 93 into digital voice data which will then be sequentially stored into the RAM 962. In the voice compressing/expanding circuit 963, the digital voice data temporarily stored in the RAM 962 are compressed/coded by way of a preselected coding system based on, for example, the CELP (code-excited linear prediction) algorithm by a means for analyzing the input data for a constant time, a means for synthesizing waveforms by the analyzed parameter, and an error calculating means of the input waveform and the synthesized waveform. The compressed voice data are temporarily stored in the RAM 962.

Conversely, the compressed/coded voice data stored in the RAM 962 are decoded/expanded by the voice compressing/expanding circuit 963, and the decoded/expanded voice data are sequentially D/A-converted by the CODEC 961 into analog decoded/expanded voice signals which are supplied via the NCU unit 95 to the voice output to the telephone, or the voice output terminal.

The CPU unit 97 is constructed of a CPU 971, a RAM 972, and GA (gate array) 973. The CPU 971 outputs various control signals via a bus to various circuit portions employed in the television telephone apparatus 41 so as to control these circuit portions, and executes a communication control program corresponding to the connected communication line.

The CPU 971 multiplexes both of the compressed image data such that the image data entered from the camera unit 91 or the external image input terminal is compressed/decoded and then temporarily stored in the RAM 933, and the compressed voice data such that the voice signal entered from the telephone, the external voice input, or the microphone input is compressed/coded and then temporarily stored in the RAM 962. The CPU 971 outputs the multiplexed data as compressed image/voice data via a bus to the modem unit 98 (will be discussed later).

Conversely, the CPU 971 receives the image/voice data which has been multiplexed/transmitted by another television telephone apparatus 41' provided at a counter party (see FIG. 4c). When this image/voice data is demodulated by the modem unit 98 and the demodulated image/voice data is entered into the CPU 971, the demodulated image/voice data is separated, and then the separated image data and voice data are outputted in combination with the compressed image data via a bus to the RAM 933. Also, the compressed voice data is outputted via a bus to the RAM 962.

A RAM 972 is such a semiconductor memory for storing therein the program data utilized in the program process executed in the CPU 971, and the compressed image/voice data.

The GA 973 is a random logic circuit provided at a peripheral portion of the CPU 971, and contains an input signal acquiring circuit for the remote controller 62 used to control the television telephone apparatus 41.

The modem unit 98 is constituted by a DSP 981 for controlling modulation/demodulation, an A/D converter, a D/A converter, an AFE (analog front end) 982 for controlling a filter and the NCU and for interfacing the CPU, a ROM 983, and a RAM 984.

Both of the DSP 981 and the AFE 982 own two functions, i.e., a modulator, and a demodulator. As this modulator, the compressed image/voice data which has been multiplexed and transmitted from the CPU 971 is converted into a transmission signal (analog signal) transmittable via the communication line. As the demodulator, the transmission signal (analog signal) transmitted through the communication line is converted into such a digital signal decodable by the CPU 971. As the communication line utilized by the NCU unit 95, it is possible to be used in the public switched telephone network.

The ROM 983 is a semiconductor memory for storing therein the program and the data used in the DSP 981. The RAM 984 is such a semiconductor memory which boots the program executed in the DSP 981 from the ROM 983 to be stored therein. Also, the program data used in the program process executed by the DSP 981 is stored, and this RAM is utilized in the transmission/reception data buffer.

It should be understood that the modem unit 98 and the NCU unit 95 employed in this television telephone apparatus can be operated at the transmission speed of 14,400 bps (bit per second) on the analog public telephone line (PSTN). As the process unit, the image data, the voice data, or the control data are constituted as a packet data structure. These packet data are transmitted in the time divisional multiplex mode. The standard density image data for one screen image is transmitted as an intermittent moving image in a rate of 1 screen image per 3.5 seconds. In the case of transmission of fine density image data, the fine density image data is transmitted as a still image during approximately 30 seconds.

OVERVIEW OF TRANSMISSION/RECEPTION OF IMAGE/VOICE DATA

Figure 6:
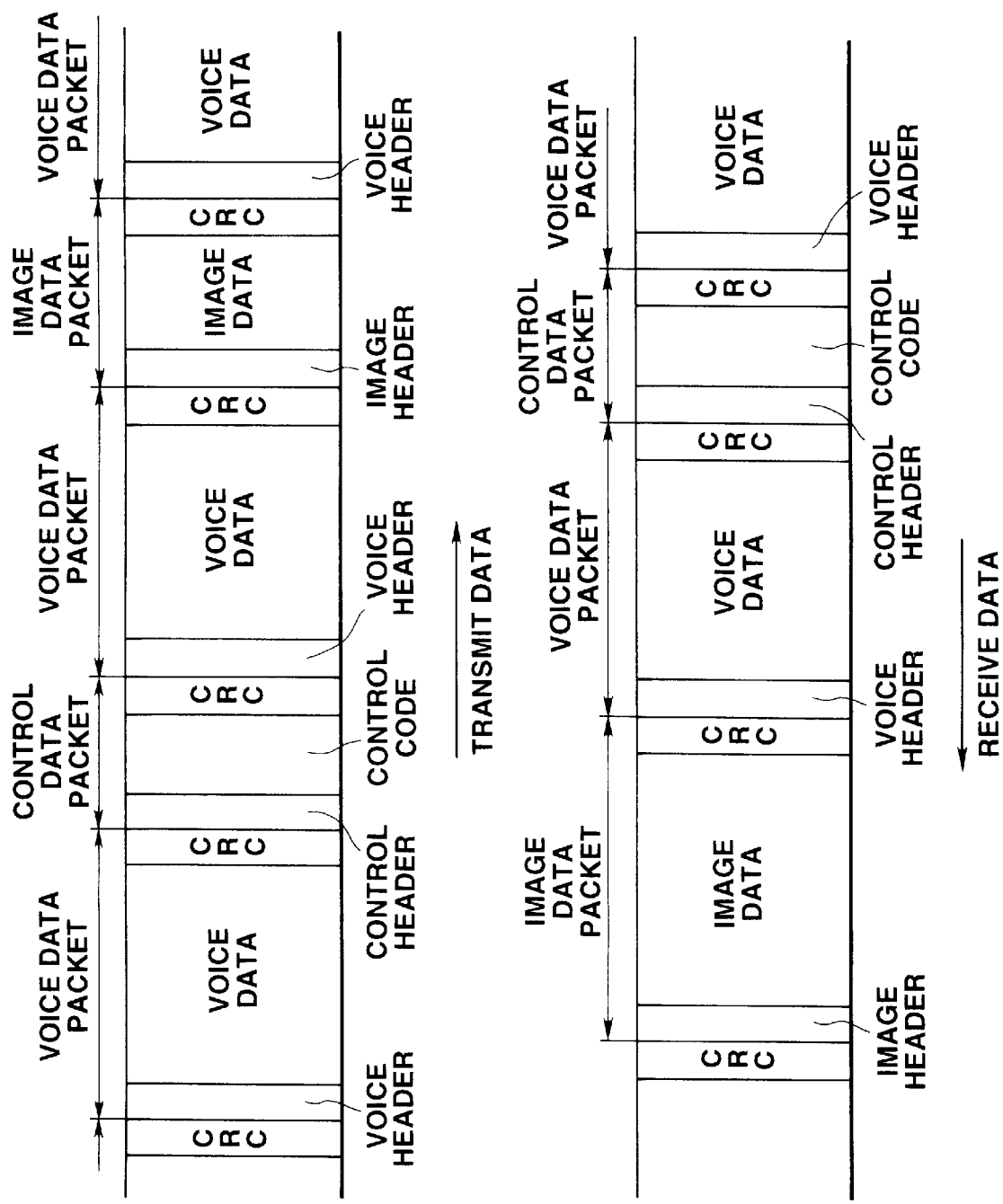
FIGS. 6a–6b schematically indicates a structure of a multiplex code used in the television telephone apparatus according to this embodiment.

The transmitting/receiving operations of the image/voice data by the television telephone apparatus 41 will now be summarized with reference to FIG. 6a and FIG. 6b. In this case, as the transmit data and the receive data, the image data, the voice data, and the control data are constituted as a data packet structure. These data packets are transmitted in the time divisional multiplex manner. Since the header and the CRC code are additionally provided with these data, the actually transmitted effective data are approximately 7,000 bps for the image data, and similarly approximately 7,000 bps for the voice data.

That is, for example, when color image data having 4,096 colors (12 bits) with 112×128 pixels as one screen is processed as the image data, a data amount of one image data becomes 112×128×12=172,032 bits (approximately 21.5 Kbytes), the image data is compressed by approximately 1/7 by way of the image compression process to obtain 24,500 bit image data. The intermittent moving image data is transmitted at a rate of one screen image during a time period defined by dividing this 24,500 bits by the bit number transmittable per 1 second (approximately 7,000 bits), namely 24,500/7,000=3.5 seconds. As a consequence, in an actual case, 49,152-bit image data obtained by dividing 172,032 bits by 3.5 is compressed by approximately 1/7 to obtain the image data having approximately 7,000 bits which is transmitted.

On the other hand, the voice data is handled as such digital data sampled at the sampling frequency of 8 kHz under the quantizing bit number of 12 bits. Then, this 96,000-bit (=12×8,000) voice data is compressed by about 1/7 and the compressed voice data is transmitted as such voice data with approximately 7,000 bits.

FIGS. 6a–6b represent a structure of a multiplex code. In this embodiment, the multiplex code is transmitted/received in the bidirectional direction due to V·32 bis model.

Subsequently, a description will now be made of certain operation examples of the television telephone apparatus 41 according to this embodiment of the present invention.

Basic operations of this embodiment will be explained with reference to FIG. 7 to FIG. 15.

Referring first to FIG. 5, both of the transmission process and the reception process about the image data and the voice data, performed in the television telephone apparatus 41, are explained. Since these process operations are simultaneously executed in a parallel mode, the transmission process operation is subdivided into an image data transmitting process and a voice data transmitting process. Also, the reception process operation is subdivided into an image data receiving process and a voice data receiving process.

IMAGE DATA TRANSMITTING PROCESS OPERATION

In the image data transmitting process operation, an electric signal is produced from the CCD 912 of the camera unit 91 in response to intensity of light of an image focused on the light receiving surface of this CCD through the lens 911. The produced electric signal is amplified by the driver 913 and the amplified signal is A/D-converted into digital image data by the analog LSI 914.

This digital image data is color-processed by the DSP 915, and then the color-processed digital image data is again D/A-converted by the analog LSI 914, so that the image data imaged by the camera unit 91 is outputted as a video signal to the video circuit unit 92.

In the video circuit unit 92, after the video signal is sync-separated to obtain a luminance signal and color difference signals, these signals are A/D-converted by the analog LSI 931 into digital data. These digital data are temporarily stored in the RAM 933, respectively, under control of the image input controlling circuit 932.

In response to the instruction issued from the CPU unit 94, the input image data temporarily stored into the RAM 933 is sequentially read out from this RAM 933 by the image input controlling circuit 932, which will then be supplied to the image compressing/expanding circuit 934.

The image compressing/expanding circuit 934 performs the compressing/decoding process operations for the input image data by way of a preselected coding system, namely the DCT quantization and the Hoffman coding for each block of 8×8 pixels in accordance with the JPEG algorithm corresponding to the still image to be handled. The compressed/coded image data is sequentially written into the RAM 933.

The compressed image data is read via the bus by the CPU 971. In the CPU 971, an image header is added to this image data, and the resultant image data is sent via the bus to the modem unit 98. The modem unit 98 adds the CRC code to the resultant image data and modulates the image data with the CRC code, and thereafter transmits the modulated image data to a counter party by the NCU unit 95.

VOICE DATA TRANSMITTING PROCESS OPERATION

In the voice data transmitting process operation, the voice data entered from the receiver of the handset of the mother unit 84 (or child unit 85) of the telephone externally provided with the television telephone apparatus 41 is inputted via the NCU unit 95 to the voice processing unit 96. The analog voice signal is A/D-converted by the CODEC 961 employed in the voice processing unit 96 into the digital voice data which will then be successively stored into the RAM 962.

Then, the voice compressing/expanding circuit 963 analyzes the digital voice data temporarily stored in the RAM 962 with respect to the input data for a constant time based on, e.g., the CELP algorithm, synthesizes waveforms based on the analyzed parameter, and executes the compressing (coding) process to the input data via the bus in accordance with a preselected coding system by an error calculating means for the input waveform and the synthesized waveform. Thus, the compressed voice data is temporarily stored in the RAM 962.

The compressed voice data is read through the bus by the CPU 971. This CPU 971 adds a voice header to the compressed voice data, and sends the resultant data via the bus to the modem unit 98. In this modem unit 98, the CRC code is added to the resultant data, and the data with the CRC code is modulated and then is transmitted via the telephone line to the counter party by the NCU unit 95.

IMAGE DATA RECEIVING PROCESS OPERATION

In the image data receiving process operation, the modulated data sent via the telephone line is supplied via the NCU unit 95 to the modem unit 98. The reception data demodulated by the modem unit 98 is read via the bus by the CPU 971. The CPU 971 judges whether or not the image header contained in the reception data is present. When it is so judged that the image data is received, this image data is temporarily stored into the RAM 933 of the video processing unit 93 via the bus. While such data which has been image-compressed/quantized/coded is sequentially read from this RAM 933, the read data is processed by the image-compressing/expanding circuit 934 by way of the decoding/dequantizing/expanding process operations. The processed data is successively written into the RAM 933.

Figure 9A:
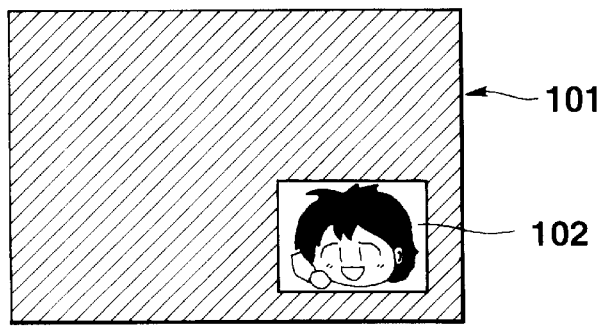
FIGS. 9a–9d schematically illustrates one screen display condition of the television telephone apparatus according to this embodiment.
Figure 9B:
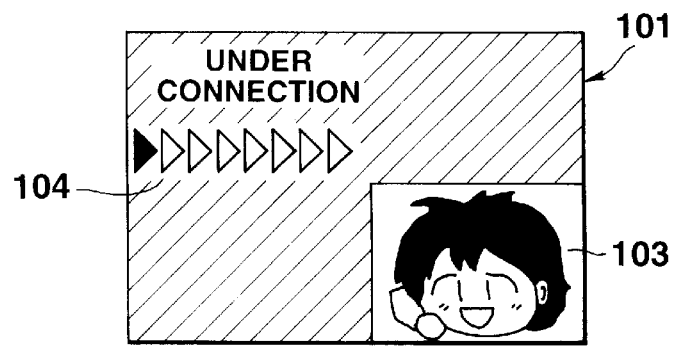
Figure 9C:
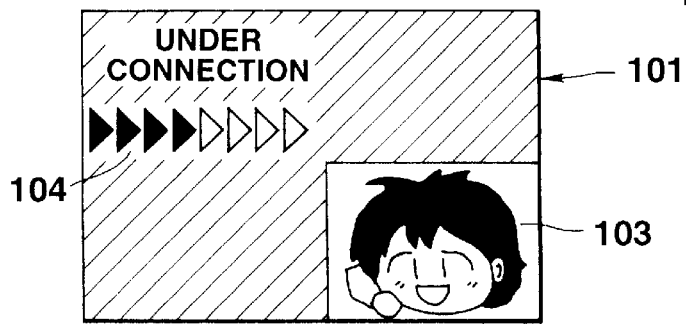
Figure 9D:
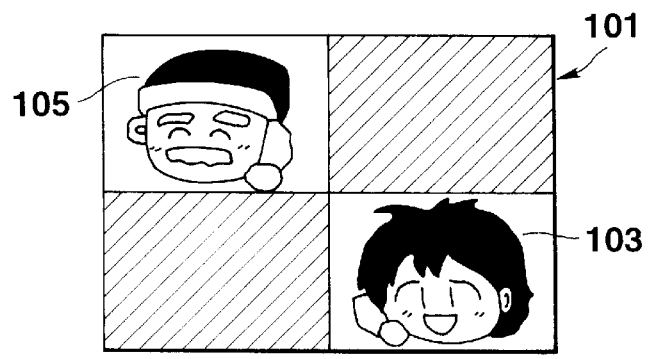

Either the input image data, or the expanded image data temporarily stored in the RAM 933 is sequentially transferred to the RAM 942 by the display control circuit 941 in response to the instruction issued from the CPU unit 97. The interpolating/thinning process operation is carried out in accordance with the display specification with respect to the transferred data, so that the output image signal (data) is produced and then is temporarily stored in the RAM 942. As an example of the display specification, an image 105 of a counter party is illustrated in FIG. 9d.

In response to the instruction issued from the CPU unit 97, the character ROM contained in the OSDC 943 is read to derive the character data, and this character data is combined with the output image signal temporarily stored in the RAM 942, and then the combined digital data is sent to the analog LSI 931. The analog LSI 931 D/A-converts this combined digital data into a corresponding analog signal which will then be outputted via the video circuit unit 92 as a video output signal.

VOICE DATA RECEIVING PROCESS OPERATION

In the voice data receiving process operation, the modulated data which has been sent through the telephone line from the counter party is demodulated via the NCU unit 95 by the modem unit 98. The CPU 971 judges whether or not the voice header contained in the received data is present. When it is so judged that the received data is the voice data, after the compressed (coded) voice data is temporarily stored into the RAM 962 via the bus, the expanding (decoding) process is performed by the voice compressing/expanding circuit 963. The expanded voice data is successively D/A-converted by the CODEC 961. The D/A-converted voice signal is outputted to either the receiver of the handset of the mother unit 84 (or child unit 85) of the telephone via the NCU unit 95, or the voice output terminal 57 (see FIG. 2a).

OVERALL PROCESS OPERATION OF TELEVISION TELEPHONE APPARATUS 41

Referring now to a flow chart shown in FIG. 7 and FIG. 8, an overall process operation of the television telephone apparatus 41 according to this embodiment will be explained.

Figure 7:
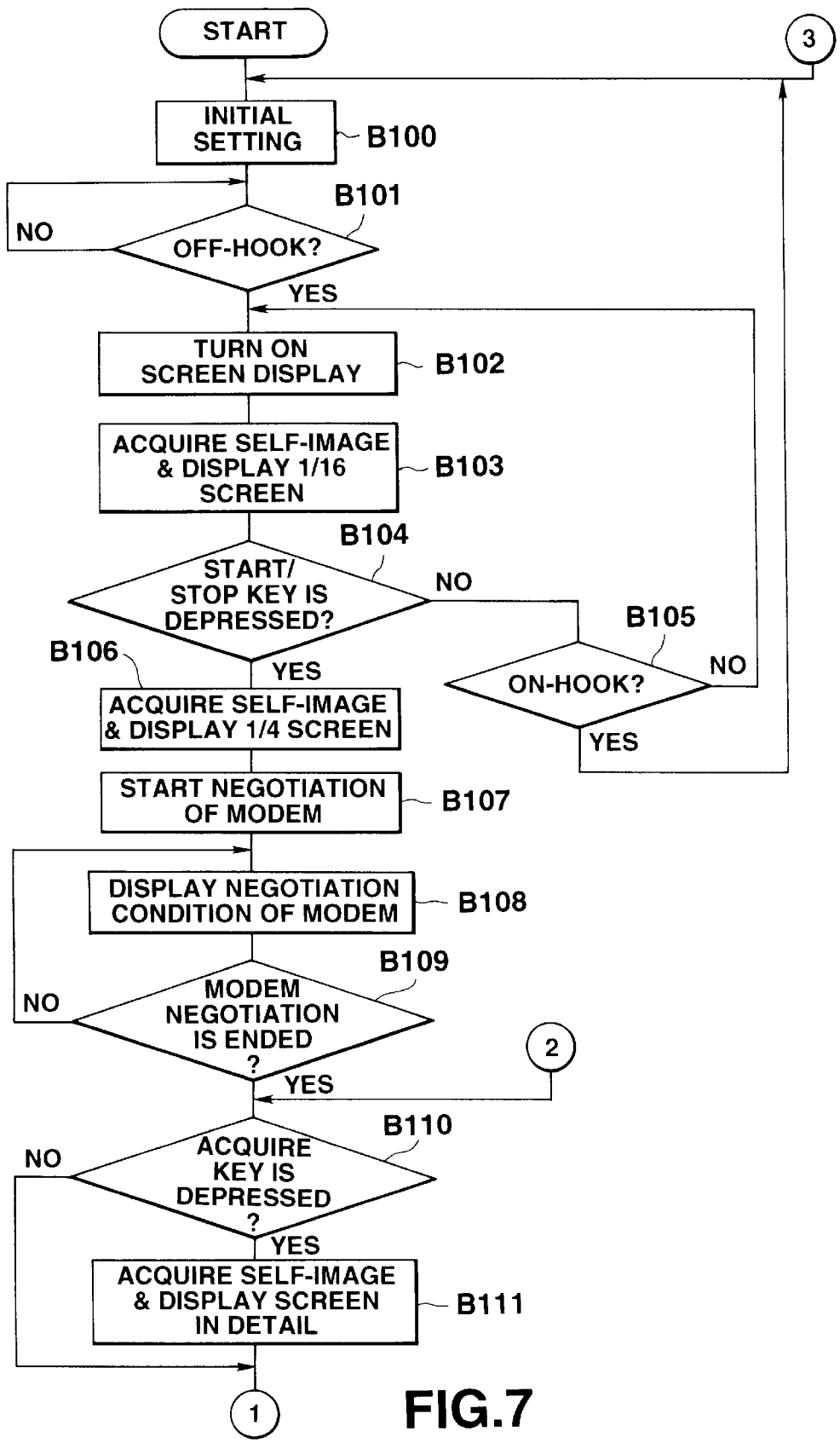
FIG. 7 is a flow chart for representing a content of processing operation performed in the television telephone apparatus of this embodiment.
Figure 8:
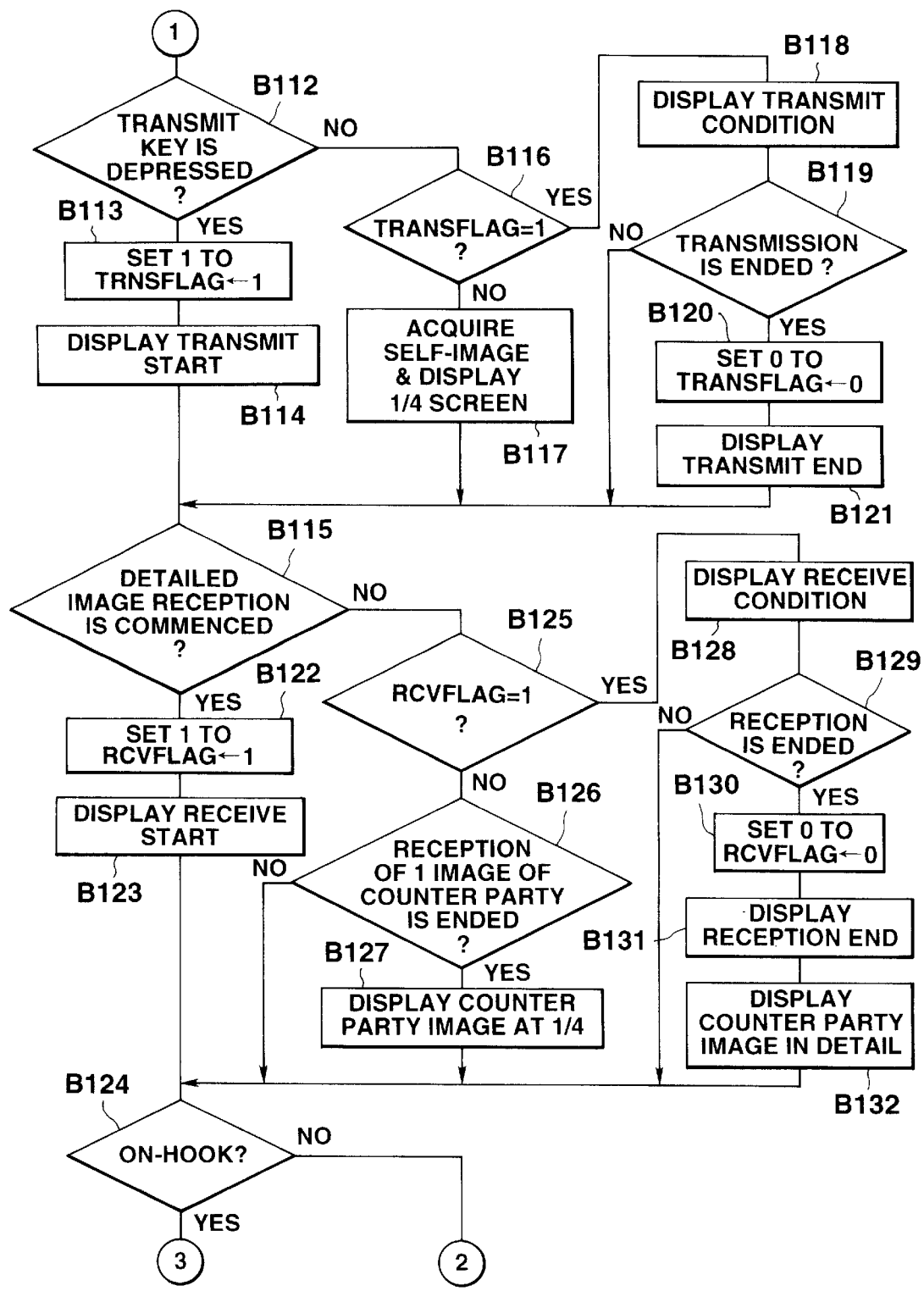
FIG. 8 is a flow chart for representing a content of processing operation performed in the television telephone apparatus of this embodiment.

As indicated in the flow chart of FIG. 7, when the power supply of the television telephone apparatus (TV phone) 41 is turned ON, an initial setting operation is performed (step B100), at which various flags are set, otherwise the screen display is turned OFF. Thereafter, this television telephone apparatus 41 is brought into the waiting condition until the OFF-hook state of the telephone is detected (step B101).

Next, as shown in FIG. 4b, when the handset of the mother unit 84 (or child unit 85) of the telephone connected to the television telephone apparatus 41 is picked up by an operation for this television telephone apparatus 41 and then the OFF-hook state is detected, the modem unit 98 for monitoring the OFF-hook signal produced from the telephone via the NCU unit 95 notifies this OFF-hook state via the bus to the CPU 971 employed in the CPU unit 97.

When this CPU 971 detects the OFF-hook state (step B101), the CPU 971 turns ON the video circuit 92 which is normally turned OFF to thereby turn ON the image display (step B102).

At this time, a self-image of the operator is acquired as a standard density image by the camera unit 91 as the image input operation, and the acquired image is displayed at a preselected screen position as the image output operation. The self-image of the operator is displayed at a lower right corner of the display screen 101 of the television receiver 81 as a small screen 102 having a size of $\frac{1}{16}$, as shown in FIG. 9a, in a mother/child display manner (step B103).

When the operator wishes to communicate with the counter party via this television telephone apparatus 41, the operator is required to depress either the start/stop button 47 mounted on the front surface of the television telephone apparatus 41 indicated in FIG. 1, or the start/stop key 74 of the remote controller 62 represented in FIGS. 3a–3b in combination with the depressing operation by the counter party.

Accordingly, a judgment is made as to whether or not either the start/stop button 47, or the start/stop key 74 is depressed (step B104). When the button or key is not depressed, another check is done as to whether or not the ON-hook state is detected at a step B105. If the handset of the telephone receiver is taken up at the step B105, namely it is not the ON-hook (hang-ON) state, then the process operation is returned to the step B102. Conversely, if the handset of the telephone receiver is hung up, namely the ON-hook state, then the process operation is returned to the above-described initial condition defined at the step B100.

When it is so judged at the step B104 that either the start/stop button 47, or the start/stop key 74 is depressed under such a condition that the handset is picked up, the self-image of the operator is commenced to be acquired. As represented in FIG. 9b, the self-image 103 of the operator is displayed on the ¼ screen located at the lower right corner in the display screen 101 (step B106). At the same time, the negotiation is commenced by the modem unit 98 (step B107). As illustrated in FIG. 9b, an elapsed time display 104 of executing this negotiation is displayed in the display screen 101 shown in FIG. 9b for about 12 seconds. This elapsed time display 104 is changed into that shown in FIG. 9c while time has passed (step B108).

As described above, in accordance with this embodiment, the self-image of the operator is acquired as the simple image and then is merely displayed on the small screen having the size of $\frac{1}{16}$ only under OFF-hook state of the handset. When the start/stop button 47, or the start/stop key 74 is depressed so that the negotiation for the line connection is commenced with the counter party, this self-image of the operator is displayed in a screen size of ¼. As a consequence, the operator can recognize as to whether or not the line connection operation is entered by merely observing the display screen size of this self-image of the operator.

Next, at a step B109, a check is done as to whether or not the negotiation by the modem unit 98 is accomplished. When it is so judged that this negotiation is ended, the process operation is advanced to a further step B110. At this step B110, another check is made as to whether or not the acquisition key 68 is depressed which is mounted on the remote controller 62 in order to acquire the fine density image of the self-image of the operator.

When the acquisition key 68 is depressed, the fine density image of the self-image of the operator is acquired to be displayed on the display screen 101 of the television receiver 81 (step B111).

FIGS. 10a–10d schematically illustrate display conditions of the display screen 101 when a desired fine density image of this self-image of the operator is acquired. First, while an image of an imaging object is displayed on the standard density image display screen, an angle and a position of this image is adjusted.

For instance, in the case that a fine density image is acquired instead of the self-image of the operator by using a VTR or a video camera connected to the video input terminal 53, the camera/video selection key 71 of the remote controller 62 shown in FIG. 3b is depressed to switch the input source. As a consequence, a camera image 106 acquired as the simple image is displayed at the lower right corner within the display screen 101 (see FIG. 10a). It should be noted that since the position of the camera image 106 is positionally shifted in the display screen of FIG. 10a, the image of the object is partially dropped. Accordingly, the angle and the position of this object image are adjusted, while observing the display screen, so as to move the object image to a center position of the ¼ screen.

Figure 10A:
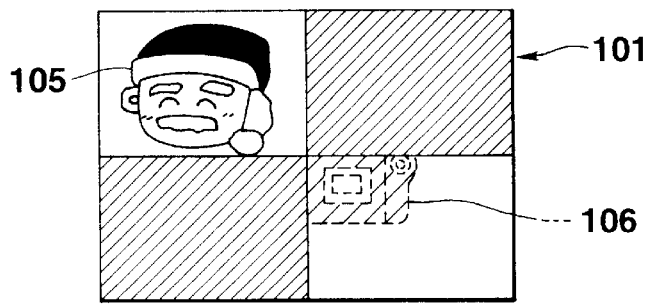
FIGS. 10a–10d schematically represents another screen display condition of the television telephone apparatus according to this embodiment.
Figure 10B:
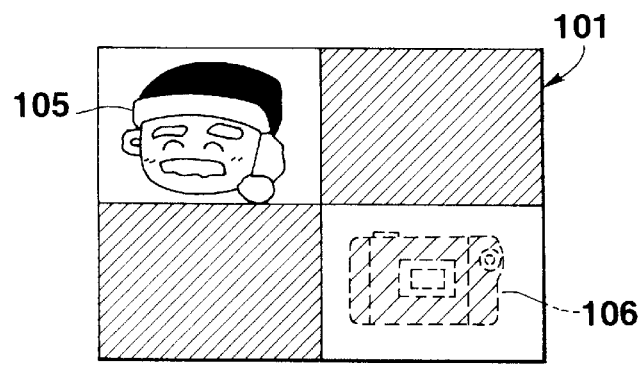
Figure 10C:
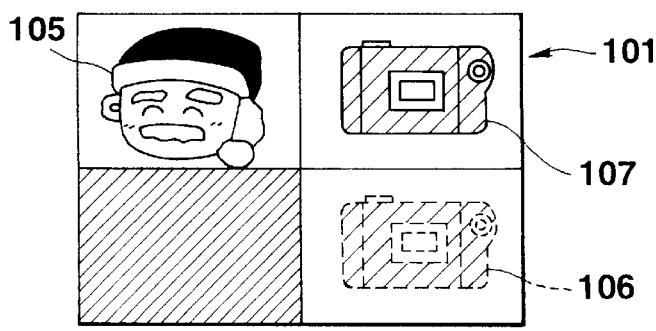

Then, when the acquisition key 68 of the remote controller 62 under this condition, a camera image 107 as a fine density image acquired every time this acquisition key 68 is depressed is displayed on the upper right subdivided screen of the display screen, as illustrated in FIG. 10c.

Conversely, when it is so judged at the above step B110 that the acquisition key 68 is not depressed, no process operation is carried out. At a step B112 of the flow chart of FIG. 8, a check is done as to whether or not the transmit key 72 provided on the remote controller 62 is depressed.

This transmit key 72 corresponds to a trigger key used when the image data about the precise self-image acquired at the preceding step is transmitted to the counter party's television telephone apparatus. When the transmit key 72 is depressed, a TRNS flag is set to "1" at a step B113. Then, after the first state of the transmission commencement is displayed (step B114), a judgment is made as to whether or not the image data about the fine density image is started to be received in response to a response signal sent from the counter party (step B115).

The image data about such a desirable fine density image acquired at this step B114 is displayed in a similar manner to FIG. 10c. As shown in this drawing, when the camera image 107 of the fine density image to be transmitted is displayed on the upper right subdivided display screen as the fine density image, the transmit key 72 of the remote controller 62 is depressed. Accordingly, even while the simple image data is transmitted at this time, this transmitting operation of the simple image data is interrupted, and the transmitting operation of the fine density image data is carried out with a top priority.

When it is so judged at the step B112 that the transmit key 72 is not depressed, a check is made at a step B116 as to whether or not the above-described TRNS flag is equal to "1". If this TRNS flag is not equal to "1", namely the fine density image data is not transferred, then the self-image of the operator is acquired to be displayed on the ¼ screen at a step B117. Then, the process operation is advanced to a step B115.

To the contrary, when the TRNS flag is equal to "1" at the above-described step B116, namely the fine density image data is transferred, the transmission condition is displayed at a step B118.

Figure 10D:
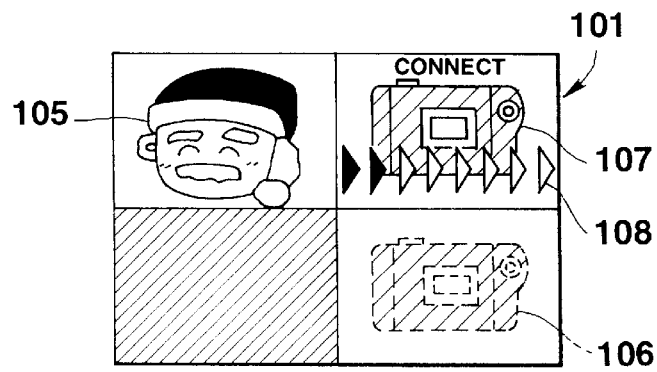

FIG. 10d represents a display condition on the display screen 101 at this time, corresponding to FIG. 10c. A transmit mark 108 for indicating that the fine density image data is under transmission is represented on the precise camera image 107. As a result, the operator can readily recognize at a glace that the image data about the desirable fine density image is being transmitted to the counter party.

After the above-explained display process for the transmit condition has been carried out, a check is done as to whether or not the transmission of the image data about the own fine density image is complete (step B119). When the image data is under transmission, no process operation is performed and the process operation is advanced to a B115. Conversely, when the image data transmission is accomplished, the TRNS flag is set to "0" (step B120), and the completion of the data transmission is displayed (step B121), and the process operation is advanced to a step B115.

At this step B115, a judgment is made as to whether or not the reception of the fine density image data from the counter party is commenced. When this fine density image data reception is commenced, an RCV flag (receive flag) is set to "1" at a step B122, and then a first display of the data reception commencement is carried out at a step B123.

Figure 11A:
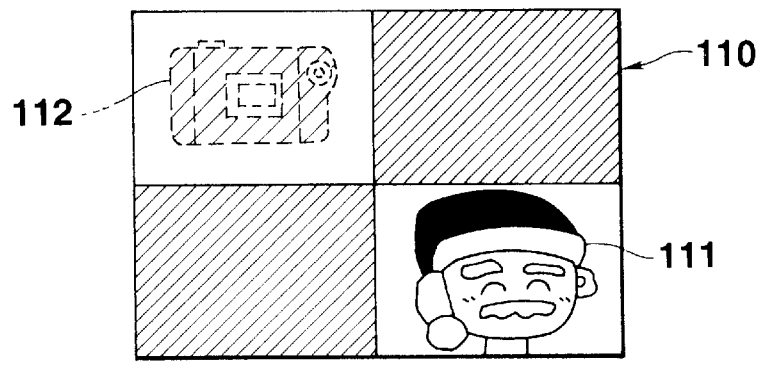
FIGS. 11a–11c schematically represents another screen display condition of the television telephone apparatus according to this embodiment.
Figure 11B:
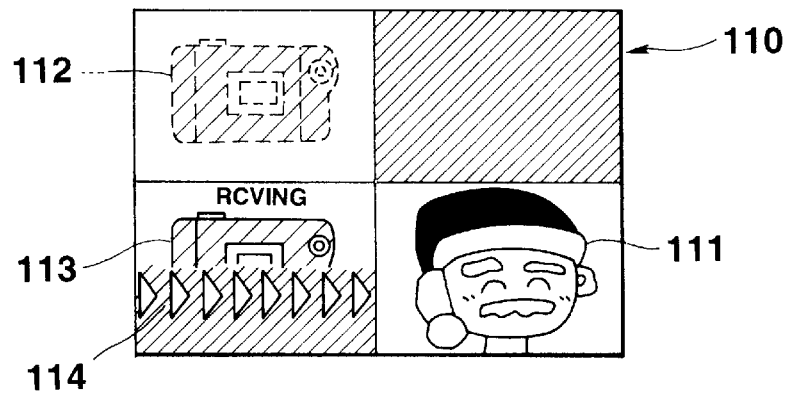
Figure 11C:
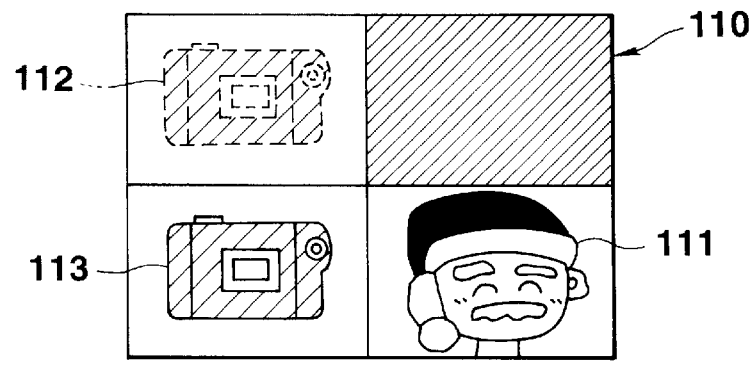

FIGS. 11a–11c indicates screen condition when the fine density image data of FIG. 10c and FIG. 10d is transmitted and received at the counter party. A display screen 110 indicated in FIGS. 11a–11c represent a display screen of a television telephone apparatus provided at the counter party. Precisely speaking, a self-image 111 of the counter party is displayed on a lower right ¼ display screen of FIG. 11a, whereas an object 112 of the simple image previously transmitted is displayed on an upper left ¼ display screen. After this representation, a check is done at a step B124 as to whether or not the telephone receiver is under ON-hook state.

When it is so judged at the above-described step B115 that the reception of the fine density image data is not yet commenced, a check is made as to whether or not the RCV flag is set to "1" (step B125). Now, if the RCV flag is equal to "0", namely under normal reception condition such that the fine density image data is not yet transmitted from the counter party, a check is done at a step B126 as to whether or not the image data about one complete simple image has been received from the counter party. Only when one complete simple image has been received, as shown in FIG. 9d, the image of this counter party is displayed on ¼ screen at a step B127, and then the process operation is advanced to a step B124.

To the contrary, when one complete image data of the counter party has not yet been ended at the previous step B126, no further process operation is performed and then the process operation is advanced to a step B124.

Also, when the RCV flag is equal to "1" at the step B125, namely under such a condition that the fine density image data is received from the communicated counter party, this reception condition is displayed on the display screen (step B128).

FIG. 11b schematically indicates a screen condition at the counter party, corresponding to that shown in FIG. 11a. The received image is displayed on the lower left ¼ divided screen of the display screen 110. Under this receiving condition, an image 113 which has been transmitted in block unit during the reception of the fine density image is sequentially displayed in combination with such a character "Under Reception" from the upper ¼ subdivided screens. Also, while time has elapsed, the content of data reception execution elapsed time display 114 is successively varied and displayed for approximately 30 seconds.

After this display process defined at the step B128 is accomplished, another check is made as to whether or not all of one fine density image of the counter party has been received (step B129).

Here, when all of one fine density image has been received, the RCV flag is cleared to be set to "0" at a step B130. Then, the end of image reception is displayed at a step B131. The image is represented based on the image data about the fine density image transmitted from the counter party at a step B132, and thereafter the process operation is advanced to a further step B124.

FIG. 11c schematically shows a screen condition on the counter part side at this time, corresponding to that of FIG. 11b. From this screen condition of FIG. 11c, an easy recognition can be made that the image reception is ended, since both the displayed character "Under Reception" and the execution elapsed time display 114, contained in the image 113 of FIG. 11b, disappear.

To the contrary, when it is so judged at the above step B129 that the image reception is not yet complete, no further process operation is performed and the process operation is advanced to a step B124.

At the step B124, a judgment is done as to whether or not the handset is under ON-hook state. When it is not under such an ON-hook condition that the handset is hung on, the process operation is returned to the above-described step B110. Under such an ON-hook condition that the handset is hung up, the process operation is returned to the initial condition defined at the step B100.

It should be noted that when the handset is hung up to be brought into the ON-hook state in this embodiment, the power supply of the television telephone apparatus 41 is automatically turned OFF. Thus, since the supply of the image data to the television receiver 81 is stopped, the representations made on the display screen 101 disappear.

As previously described in detail, in the television telephone apparatus according to one embodiment of the present invention, the original feature of the television telephone apparatus can be realized such that the telephone conversation is made while observing the face of the counter party in telephone communication, and on the other hand, the presently installed telephones and television receivers in home can be utilized. Moreover, a plurality of images can be displayed in the multi-mode under practically usable screen sizes by subdividing the large-sized display screen of the home-use TV receiver, which could not be available in the conventional one-body type television telephone apparatus. Furthermore, the television telephone apparatus of the present invention can be made compact and in light weight as well as low cost. As a consequence, high-grade image transmissions could be realized.

OTHER DISPLAY MODES

A description will now be made of other display modes realized in the television telephone apparatus according to the present invention with reference to FIG. 12. That is, a multi-screen display condition indicated in FIG. 12a similar to those of the image data transmitting/receiving process operations, as explained in FIG. 9 to FIG. 11, may be freely changed into a full-sized screen display condition of FIG. 12b, and also a so-called "picture-in-picture" display condition of FIG. 12c (namely, mother/child screens).

Figure 12A:
FIGS. 12a–12c schematically represents another screen display condition of the television telephone apparatus according to this embodiment.

In this case, four screen images displayed on this multi-screen display shown in FIG. 12a are defined as follows: (1) indicates a simple image; (2) represents a fine density image; (3) shows a received simple image; and (4) denotes a received fine density image.

More specifically, the simple image (1) of FIG. 12a corresponds to such an image that both of image acquisition time and image transmission time are short, and image precision is low. As this simple image, either the image derived from the built-in camera, or the externally inputted image are inverted with respect to the right and left directions to be displayed. During the normal operation, this simple image (1) is transmitted to the counter party in telephone communication.

The fine density image (2) of FIG. 12a corresponds to such an image whose precision degree is high, although the image acquisition time and the image transmission time are prolonged, as compared with those of the above-described simple image. Either the fine density image acquired from the camera, or the precise image stored in the memory are displayed as this fine density image (2). When the fine density image is transmitted to the counter party in telephone communication, this fine density image (2) is transmitted.

The received simple image (3) of FIG. 12a is such a simple image transmitted from the counter party in telephone communication. This simple image corresponds to such an intermittent moving image which is intermittently transmitted from the counter party every 3.5 seconds.

The received fine density image (4) of FIG. 12a is such a fine density image in a still image mode transmitted from the counter party.

As described above, both of the self-image of the operator and the image of the counter party in telephone communication are displayed in the multi-screen display mode. Moreover, such images whose precision degrees are different from each other are displayed at the same time. While these fine density images are compared with each other, and also pleasant telephone conversation is established, one interest image is selected from the four multi-displayed images as shown in FIG. 12a. Thereafter, the selected image may be displayed in the enlarge mode as a full-sized screen display as represented in FIG. 12b.

Figure 12B:
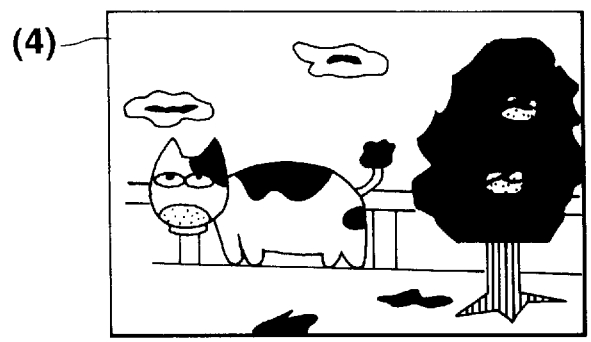

In FIG. 12b, the received fine density image (4) of FIG. 12a is derived and displayed in the enlarged manner. Accordingly, since the detailed content of this fine density image (4) can be easily observed and also the telephone conversation is made while paying an attention to only one image 12b, both of the operator and the counter party can concentrate their telephone conversation. It is apparent from the foregoing description that any other images, i.e., the simple image (1) of FIG. 12a, the fine density image (2), and the received simple image may be selected so as to be displayed in the enlarged manner.

Figure 12C:
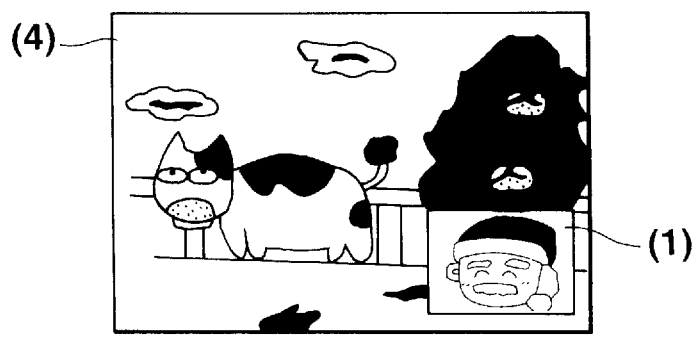

In addition, as the mother/child screen at the initial operation of FIG. 9a, the present image screen may be changed into such a "picture-in-picture" screen display as shown in FIG. 12c. In this case, the child screen is additionally displayed at the corner of the mother screen (full-sized screen), so that the present display condition is changed into the two-screen display. The images may be displayed in various combination patterns by changing the contents of the images to be displayed on the mother screen and the child screen. For instance, in accordance with this operation example, the various image combinations from the above-described images (1) to (4) may be represented by the following patterns of "image of mother screen+ image of child screen":

"Mother: simple image (1)+ Child: received simple image (3)",

"Mother: fine density image (2)+ Child: simple image (1)",

"Mother: fine density image (2)+ Child: received simple image (3)",

"Mother: received simple image (3)+ Child: simple image (1)",

"Mother: received fine density image (4)+ Child: simple image (1)", and

"Mother: received fine density image (4)+ Child: received simple image (3)".

With respect of any one of the above-described combinations, a selection may be made that the major screen is the full-sized screen, and the minor screen is the child screen. Then, FIG. 12c represents the final combination pattern "Mother: received fine density image (4)+ Child: received simple image (3)", both of which images indicate only the counter party's images.

As described above, the display screen of this television telephone apparatus is featured such that not only the self-image/counter party's image, but also the images having the different precision degrees can be simultaneously displayed in the multi-screen display. Also, the image of interest displayed on the multi-screen may be picked up so as to be displayed in the full-sized screen display mode, or the P-in-P screen display mode. Accordingly, more easy and convenient display screens may be constituted.

In the television telephone apparatus according to this embodiment, as represented in FIG. 10a, the entire display screen is subdivided into four small screens, and the unused subdivided screen regions other than the subdivided screen regions on which the self-image and the counter party's image are displayed are indicated with blue background (namely, hatched portions). This may achieve better visibility, since when the characters are indicated in the unused subdivided screen regions with a preselected background color, a contrast can be established between the characters and the background.

In the case that the unused subdivided screen regions are colored, the entire screen region may be colored in the same color, or in the different colors, depending on the functions of the subdivided screens (for example, in such a case that position of screen to be displayed is determined). As a consequence, it is readily possible to understand the functions of the subdivided screens by merely observing the colors of the subdivided regions. Moreover, as described above, when the subdivided regions are colored in accordance with the functions thereof, the overall subdivided screen region is not colored, but may be colored by the relevant color frames. Thus, a similar effect may be achieved by coloring only one portion of the relevant screen region.

As previously explained in detail, since not only the self-image/counter party's image, but also the images having the different precision degrees can be simultaneously displayed in the television telephone apparatus according to this embodiment, the telephone conversation can be made while comparing these images with each other, so that the operability of this television telephone apparatus can be improved.

It should be noted that although the present invention has been suitably applied to such a television telephone apparatus detachably connected to the home-use television receiver, the present invention may be similarly applied to another television telephone apparatus made with either the telephone, or the image display apparatus in an integral form.

Although the entire display screen has been divided into four subdivided screens in the above-explained embodiment, the present invention is not limited thereto.

The television telephone apparatus according to the present invention may be connected not only to the public switched telephone network (PSTN), but also other communication lines such as ISDN.

Moreover, the present invention is not limited to the above-explained image data/voice data compressing system, and transmission format, but may be realized by other data compressing systems and other transmission formats.

What is claimed is:

1. An image data displaying method for controlling operation of a television telephone apparatus which includes communication system for communicating with a communication counterparty and imaging means for producing one of image data having a first precision degree and image data having a second precision degree higher than said first precision degree, said method comprising the steps of:

displaying said image data having the first precision degree on a display screen when said television telephone apparatus is in a first state;

displaying a negotiation state of said communication system on said display screen when said television telephone apparatus is in a second state;

displaying said image data having the first precision degree on said display screen in a display mode different from that of said first state when said television telephone apparatus is in a third state;

displaying said image data having the second precision degree higher than the first precision degree of said image data on a portion of said display screen when said television telephone apparatus is in a fourth state; and displaying a transmission condition of said image data having the second precision degree on said display screen when said television telephone apparatus is in a fifth state.

2. The image displaying method according to claim 1, wherein said first state corresponds to a preparation state in which a power supply of said television telephone apparatus is turned ON to commence a communication.

3. The image data displaying method according to claim 1, wherein said second state corresponds to a state in which an operation for commencing a communication of said communication system is carried out.

4. The image data displaying method according to claim 1, wherein said third state corresponds to a state in which a communication line is established to be connected to the communication counterparty.

5. The image data displaying method according to claim 1, wherein said fourth state corresponds to a state in which an operation for producing said image data having the second precision degree is carried out.

6. The image data displaying method according to claim 1, wherein said fifth state corresponds to a state in which an operation for transmitting said image data having the second precision degree is carried out.

* * * * *